（12）United States Patent
Busch et al.

(10) Patent No.: US 11,691,469 B2
(45) Date of Patent: Jul. 4, 2023

(54) MULTI-LAYERED SHEET MATERIAL COMPRISING AT LEAST ONE SUPPORTING WOVEN FABRIC, CROSSWAY ELEMENT COMPRISING SUCH A MULTI-LAYERED SHEET MATERIAL, AND VEHICLE, AIR PASSENGER BRIDGE OR STAIRCASE COMPRISING SUCH A CROSSWAY ELEMENT

(71) Applicant: Hübner GmbH & Co. KG, Kassel (DE)

(72) Inventors: Thomas Busch, Reinhardshagen (DE); Andreas Wiegrefe, Petersberg (DE); Reinhard Hübner, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 1003 days.

(21) Appl. No.: 16/483,559

(22) PCT Filed: Feb. 8, 2018

(86) PCT No.: PCT/EP2018/053229
§ 371 (c)(1),
(2) Date: Aug. 5, 2019

(87) PCT Pub. No.: WO2018/146227
PCT Pub. Date: Aug. 16, 2018

(65) Prior Publication Data
US 2020/0023699 A1    Jan. 23, 2020

(30) Foreign Application Priority Data
Feb. 9, 2017    (DE) .................... 10 2017 102 626.6

(51) Int. Cl.
*B60D 5/00* (2006.01)
*B29L 31/00* (2006.01)
(Continued)

(52) U.S. Cl.
CPC .............. *B60D 5/003* (2013.01); *B60D 5/006* (2013.01); *B29L 2031/703* (2013.01);
(Continued)

(58) Field of Classification Search
CPC ... B60D 5/003; B60D 5/006; B29L 2031/703; B32B 5/024; B32B 5/14; B32B 5/142;
(Continued)

(56) References Cited

U.S. PATENT DOCUMENTS 2,408,473 A * 10/1946 Nelson ................... B61D 17/20
105/20
4,860,665 A * 8/1989 Schmidt ................. B61D 17/22
427/504

(Continued)

FOREIGN PATENT DOCUMENTS

DE    1961728 A1    12/1970
DE    3835045 A1    4/1990
(Continued)

OTHER PUBLICATIONS

European Patent Office, Rijswijk, Netherlands, International Search Report of International Application No. PCT/EP2018/053229, dated Jun. 4, 2018, 3 pages.

*Primary Examiner* — Kevin Hurley
*Assistant Examiner* — Michael R Stabley
(74) *Attorney, Agent, or Firm* — Dickinson Wright PLLC

(57) ABSTRACT

A multi-layered sheet material (1) including a reinforcing support (2) having a polymer coating (3) on at least one side, alternatively on both sides, wherein the reinforcing support (2) includes at least one textile fabric (6), such as a supporting woven fabric (6*a*), wherein the fabric (6), has at least two surface regions (13*a*; 13*b*; 34*a*; 34*b*) that differ from each other in at least one mechanical property, as well as a crossway element, such as a crossway bellows, for compo-
(Continued)

nents, vehicles, building connections, or for flight passenger bridges or staircase bridges, including at least one such multi-layered sheet material, and a vehicle, a building connection, and a flight passenger or staircase bridge including such a crossway element.

26 Claims, 6 Drawing Sheets

(51) Int. Cl.
    *B32B 5/02*     (2006.01)
    *B62D 47/02*     (2006.01)
    *B61D 17/22*     (2006.01)

(52) U.S. Cl.
    CPC ............ *B32B 5/024* (2013.01); *B32B 2255/26* (2013.01); *B32B 2605/00* (2013.01); *B61D 17/22* (2013.01); *B62D 47/025* (2013.01)

(58) Field of Classification Search
    CPC ...... B32B 5/145; B61D 17/22; B62D 47/025; D03D 25/005
    See application file for complete search history.

(56) References Cited

U.S. PATENT DOCUMENTS

| | | | |
|---|---|---|---|
| 5,456,186 A | 10/1995 | Hübner | |
| 5,546,866 A | 8/1996 | Koch | |
| 5,884,565 A * | 3/1999 | Koch | B60D 5/003 |
| | | | 105/20 |
| 6,840,529 B2 * | 1/2005 | Call | B62D 47/025 |
| | | | 280/455.1 |
| 7,568,435 B2 * | 8/2009 | Mosaner | B61D 17/22 |
| | | | 105/20 |
| 7,600,772 B2 * | 10/2009 | Koch | B61D 17/22 |
| | | | 280/401 |
| 7,669,615 B2 * | 3/2010 | Koch | B61D 17/22 |
| | | | 138/121 |
| 7,743,712 B2 * | 6/2010 | Goebels | B61D 17/22 |
| | | | 105/10 |
| 7,866,683 B2 * | 1/2011 | Browne | B61D 17/22 |
| | | | 105/20 |
| 7,971,924 B2 * | 7/2011 | Tabellini | B60D 5/003 |
| | | | 105/20 |
| 8,833,787 B2 * | 9/2014 | Zolotov | B60D 5/003 |
| | | | 280/403 |
| 9,889,863 B2 * | 2/2018 | Mosaner | B60D 5/003 |

FOREIGN PATENT DOCUMENTS

| | | | | |
|---|---|---|---|---|
| DE | 29511398 U1 | 9/1995 | | |
| DE | 4419410 A1 | 12/1995 | | |
| DE | 102004043193 A1 * | 3/2006 | ............ | B32B 5/10 |
| DE | 102004043193 A1 | 3/2006 | | |
| DE | 102011107370 A1 | 1/2013 | | |
| DE | 102016109070 A1 | 11/2017 | | |
| EP | 0226971 A2 | 7/1987 | | |
| EP | 0544203 A1 | 6/1993 | | |
| EP | 0698514 A1 | 2/1996 | | |
| GB | 1298936 | 12/1972 | | |
| WO | 2017198683 A1 | 11/2017 | | |

* cited by examiner

MULTI-LAYERED SHEET MATERIAL COMPRISING AT LEAST ONE SUPPORTING WOVEN FABRIC, CROSSWAY ELEMENT COMPRISING SUCH A MULTI-LAYERED SHEET MATERIAL, AND VEHICLE, AIR PASSENGER BRIDGE OR STAIRCASE COMPRISING SUCH A CROSSWAY ELEMENT

CROSS REFERENCE TO RELATED APPLICATIONS

This application is a 35 U.S.C. § 371 national phase application of International Application No.: PCT/EP2018/053229, filed Feb. 8, 2018, which claims the benefit of priority under 35 U.S.C. § 119 to German Patent Application No.: 10 2017 102 626.6, filed Feb. 9, 2017, the contents of which are incorporated herein by reference in their entirety.

FIELD

The present invention relates to a multi-layered sheet material comprising a reinforcing support having a polymer coating at least on one side, alternatively on both sides, wherein the reinforcing support comprises at least one textile fabric or a planar supporting fabric, alternatively a supporting woven fabric.

The invention further relates to a crossway element, in particular a crossway bellows, for components, vehicles, building connections or for flight passenger bridges or staircases, comprising at least one such multi-layered sheet material, wherein the crossway element serves to protect a passageway of two vehicle parts or components, which are movably connected to each other, or of two building parts, in particular of two vehicle parts or components being interconnected in an articulated manner, from external influences.

In addition, the invention relates to a vehicle, a building connection and a flight passenger bridge or staircase with such a crossway element, in particular a crossway bellows.

BACKGROUND

The statements in this section merely provide background information related to the present invention and may not constitute prior art.

It is known to use crossway bellows in the form of pleated or corrugated bellows as crossway protection for the passage between the individual, mutually articulated and connected vehicle parts of a vehicle, in particular of an articulated bus or of a rail vehicle, or as crossway protection for flight passenger bridges. The pleats or corrugations provide for the necessary extensibility in the drive direction so that relative movements of the vehicle parts or of the flight passenger bridge members are possible. The pleated or corrugated bellows comprise a bellows wall made of a multi-layered sheet material with a central reinforcing support, wherein the bellows wall is fixed into bellows frames at regular intervals to form the corrugations or pleats. For this purpose, the bellows frames are formed to be U-shaped in cross section, wherein the bellows wall is clamped into the opening of the bellows frame. This kind of pleated bellows is known, for example, from EP 0 698 514 B1. Clamping of the bellows wall is complicated.

DE 10 2004 043 193 A1 discloses a single- or multi-layer, alternatively double-layer textile, wherein the textile is provided on both sides with a flame-resistant, elastic coating, wherein the at least one textile layer has a lattice structure made of high-temperature-resistant and/or flame-resistant material. Furthermore, the lattice structure is configured such that under the influence of heat, channels form between the coating and the textile, alternatively in two spatial directions toward the zone of the highest heat of the single- or multi-layer textile, in order to discharge toward the zone of highest heat the gases produced during the burning of the textile, wherein in a woven fabric the lattice structure is produced by two separate warp and/or weft threads spaced with respect to each other made of high-temperature-resistant or flame-resistant threads that are connected to the textile layer.

SUMMARY

The object of the present disclosure is to provide a multi-layered sheet material for a generic crossway element, which comprises a reinforcing support having a polymer coating at least on one side, alternatively on both sides, wherein the sheet material is simple and low in cost to produce and is optimally adaptable to the mechanical requirements, in particular with respect to the mechanical properties, in particular the stiffness.

An additional object of the present disclosure is to provide a crossway element, in particular a crossway bellows, for protecting a crossway of two components or vehicle parts which are connected together movably relative to each other, in particular of two vehicle parts or components being interconnected in an articulated manner, against external influences, wherein the crossway element comprises at least two tensioning elements being spaced apart from each other and having stretched a sheet material as crossway member wall in between.

An additional object is to provide a vehicle or a flight passenger bridge or staircase with such a crossway element.

The objects are solved by a multi-layered sheet material, a crossway element, a vehicle, a flight passenger bridge or staircase, and a building connection. The multi-layered sheet material generally comprises a reinforcing support that includes a polymer coating at least on one side, alternatively on both sides, and at least one textile fabric that has at least two surface regions, which differ from each other in at least one mechanical property. According to a further embodiment, the multi-layered sheet material generally comprises a reinforcing support that includes a polymer coating at least on one side, alternatively on both sides, and at least one supporting woven fabric that comprises a base woven fabric made of base warp threads and base weft threads, as well as at least one planar reinforcing region having a plurality of additional reinforcing warp threads and/or a plurality of additional reinforcing weft threads that are woven with the base woven fabric.

The crossway element comprises at least two tensioning elements spaced apart from each other and at least one multi-layered sheet material stretched between the at least two tensioning elements. The vehicle or building connection comprises at least two parts connected together at a passageway that is protected by at least one crossway element, such as a crossway bellows. Similarly, a crossway element is utilized to protect the passageway of the flight passenger bridge or staircase to the aircraft and/or to the terminal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
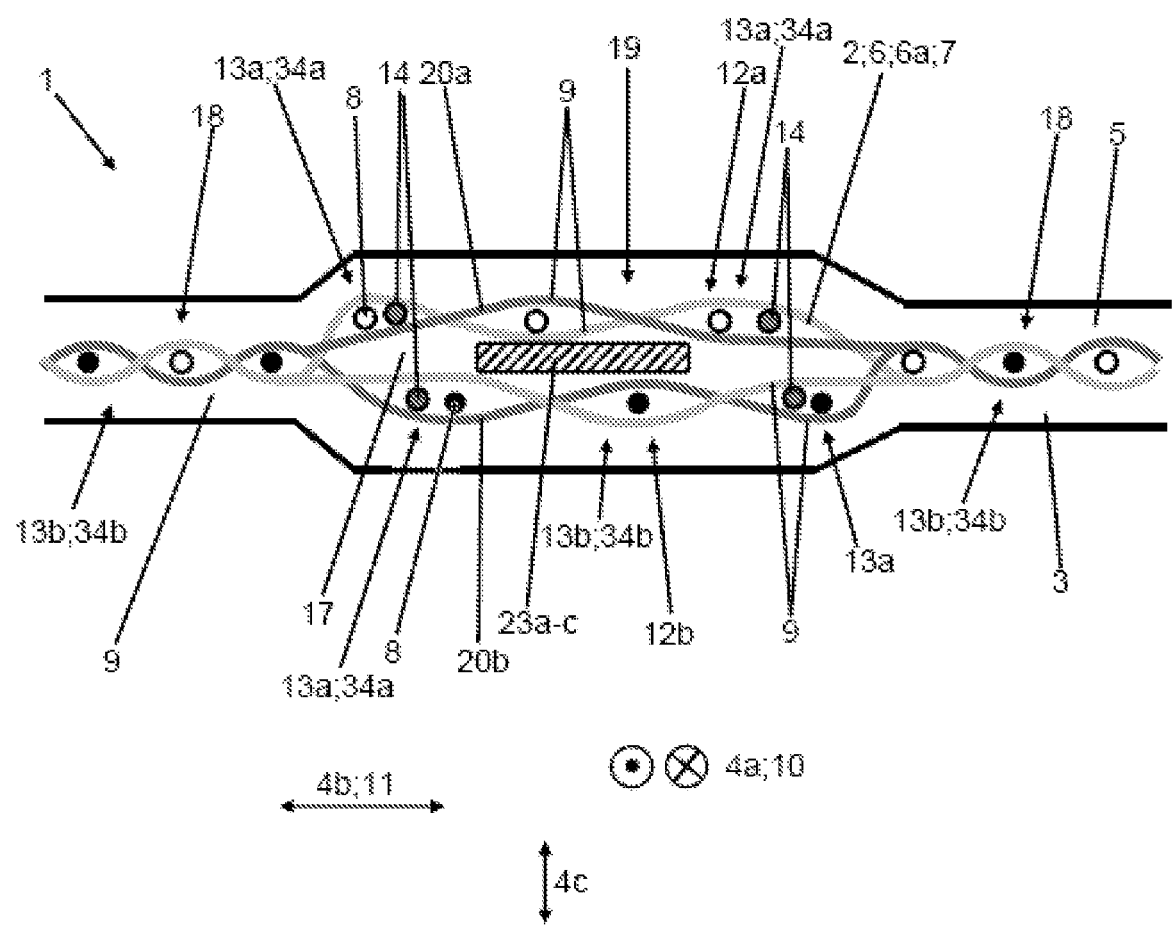
FIG. 1 is a greatly simplified and highly schematic cross-sectional view of a sheet material according to the present disclosure with a supporting woven fabric with reinforcing warp threads.

The drawings described herein are for illustration purposes only and are not intended to limit the scope of the present disclosure in any way.

DETAILED DESCRIPTION

The following description is merely exemplary in nature and is in no way intended to limit the present invention or its application or uses. It should be understood that throughout the description and drawings, corresponding reference numerals indicate like or corresponding parts and features.

The multi-layered flexible sheet material 1 according to the present disclosure (FIG. 1) comprises a central, plane reinforcing support layer or rather a central, plane reinforcing support 2, which has an outer or external polymer coating 3 on both sides. The polymer coating 3 respectively forms the outer side of the multi-layered sheet material 1.

In addition, the multi-layered sheet material 1 comprises a first spatial direction or rather surface direction 4a, as well as a second spatial direction or rather surface direction 4b perpendicular thereto. According to another aspect, the multi-layered sheet material 1 has an area-measured extension into the first and second surface direction 4a; 4b. In addition, the sheet material 1 comprises a thickness direction or rather a height direction 4c, which is perpendicular to the two surface directions 4a; 4b. The plane reinforcing support 2 consequently likewise has an area-measured extension in the first and second surface direction 4a; 4b as well as a height or thickness extension in the thickness direction 4c.

The polymer coating 3 consists of a polymer matrix 5, into which fillers, in particular flame-retardant fillers, may be embedded. The polymer matrix 5 consists in particular of a polymer material or rather polymer according to DIN 7724-1993-04. Alternatively, the polymer matrix 5 consists of an elastomer according to DIN 7724-1993-04. Accordingly, elastomers are shape-keeping, but elastically deformable polymers whose glass transition point is below the working temperature. The elastomers can be elastically deformed on tensile and pressure load, but thereafter return to their original, not deformed shape. The polymer matrix 5 may consist of vulcanized rubber, in particular of vulcanized silicone rubber or vulcanized natural rubber, or of CSM (chlorosulfonated polyethylene) or EPDM (ethylene-propylene-diene rubber) or EVA (ethylene vinyl acetate) or PVC (polyvinyl chloride) or of PU (polyurethane) or mixtures thereof.

The reinforcing support 2 comprises a textile fabric or a textile, flat support 6 that includes at least two surface regions 34a; 34b, wherein the two surface regions 34a; 34b differ from each other at least in one mechanical property. The two surface regions 34a; 34b may differ with respect to at least one mechanical strength property. The two surface regions 34a; 34b differ particularly in at least one surface direction 4a; 4b with respect to the maximum tensile force $F_H$ according to DIN EN ISO 13934-1:2013 and/or the elongation at maximum tensile force $\varepsilon_H$ according to DIN EN ISO 13934-1:2013 and/or the ratio of tensile force according to DIN EN ISO 13934-1:2013 to elongation according to DIN EN ISO 13934-1:2013.

The surface regions 34a; 34b have a planar extension in the surface directions 4a; 4b of the multilayer sheet material 1 or of the textile fabric 6. Therefore, they are two-dimensional structures or the surface regions 34a; 34b have a two-dimensional extension. A single thread that differs from the other threads of the textile sheet material still does not form a surface region in the sense of the present disclosure. This is only a one-dimensional textile structure.

Alternatively, the textile fabric 6 is a supporting woven fabric 6a. The supporting woven fabric 6a comprises a base woven fabric 7 out of base warp threads 8 extending in the first surface direction 4a, and base weft threads 9 intersecting the base warp threads 7 and extending parallel to the second surface direction 4b. The first surface direction 4a thus corresponds to a warp direction 10 and the second surface direction 4b thus corresponds to a weft direction 11 of the supporting woven fabric 6a. In addition, the supporting woven fabric 6a comprises a woven fabric top side 12a and a woven fabric bottom side 12b.

Furthermore, according to the present disclosure the supporting woven fabric 6a comprises at least one, alternatively a plurality of planar reinforcing regions 13a (FIGS. 2-4) that extend two-dimensionally only over a partial region of the entire two-dimensional extension of the supporting woven fabric 6a.

According to a first embodiment of the present disclosure the supporting woven fabric 6a comprises in the region of the reinforcing regions 13a a plurality of additional reinforcing warp threads 14 and/or reinforcing weft threads 15 that are woven into or woven with the base woven fabric 7, in addition to the base warp threads 8 or base weft threads 9. In addition means that the reinforcing warp threads 14 or reinforcing weft threads 15 are not present instead of the base warp threads 8 or the base weft threads 9, but rather in addition to these. The warp thread density or the weft thread density of the supporting woven fabric 6a is thus greater in the reinforcing regions 13a than in the non-reinforced regions.

Figure 2:
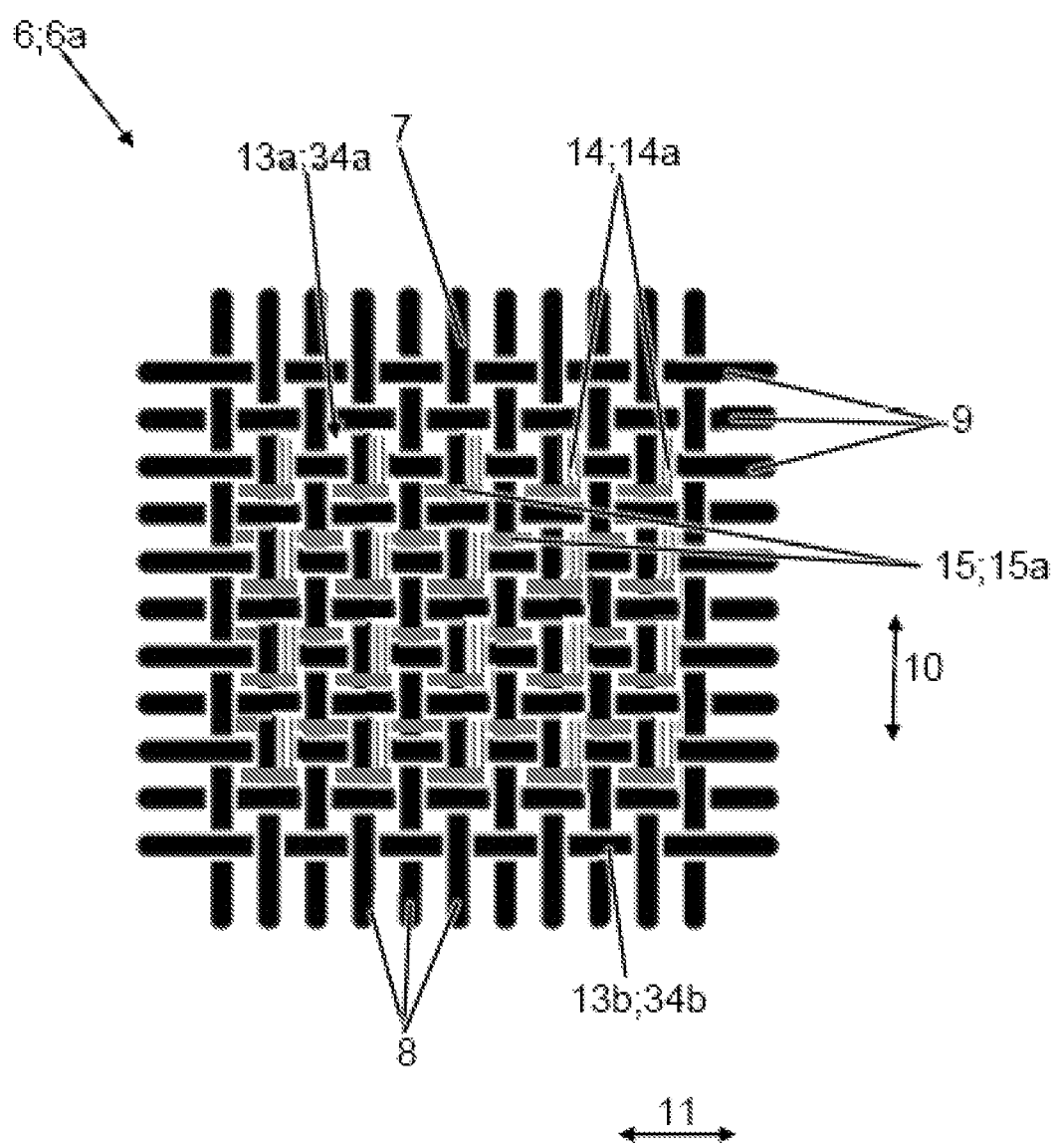
FIG. 2 is a top view schematic of a supporting woven fabric of the sheet material according to the present disclosure according to a first embodiment with reinforcing warp threads and reinforcing weft threads.
Figure 3:
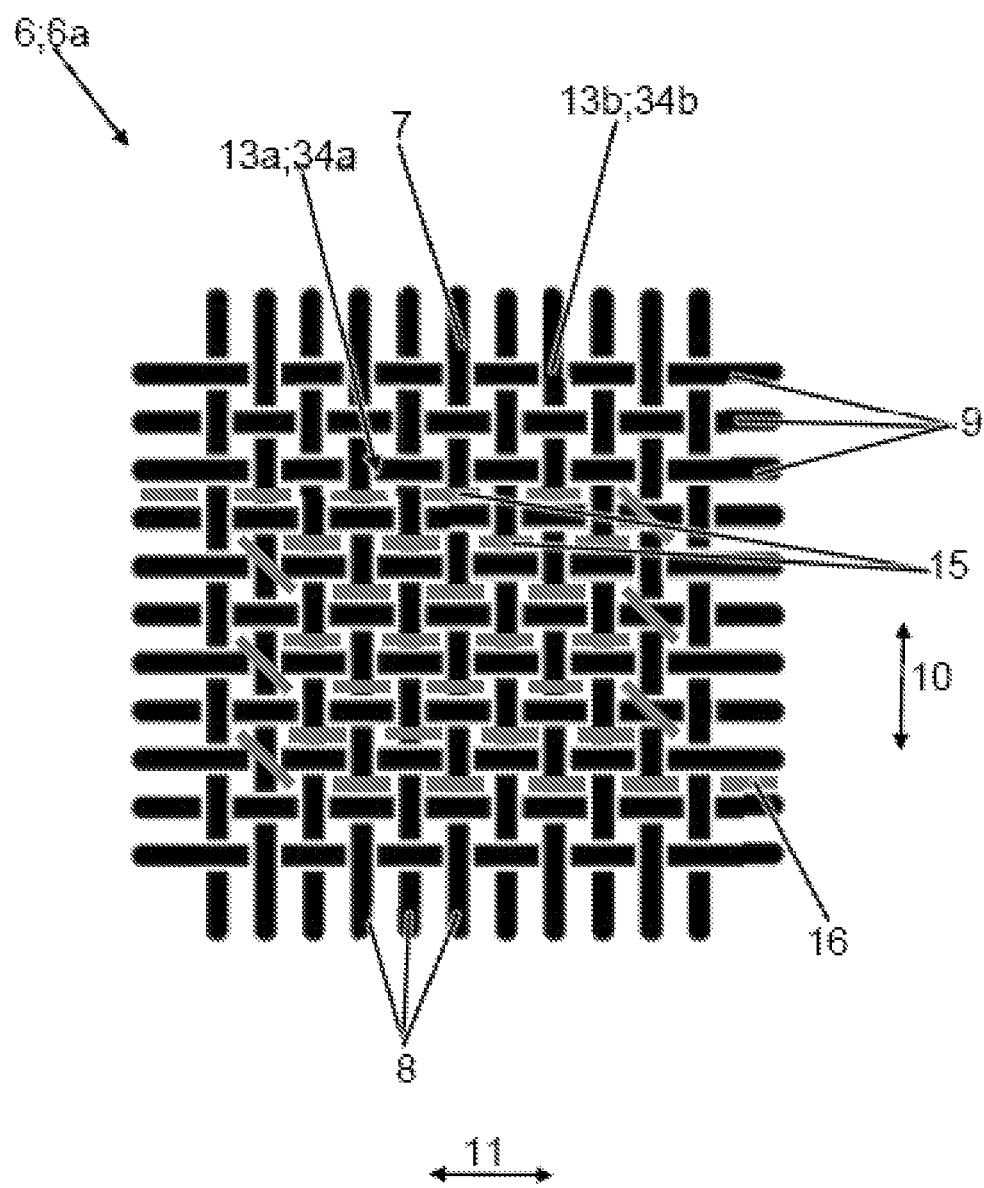
FIG. 3 is a top view schematic of a supporting woven fabric of the sheet material according to the present disclosure according to a further embodiment with reinforcing weft threads only.
Figure 4:
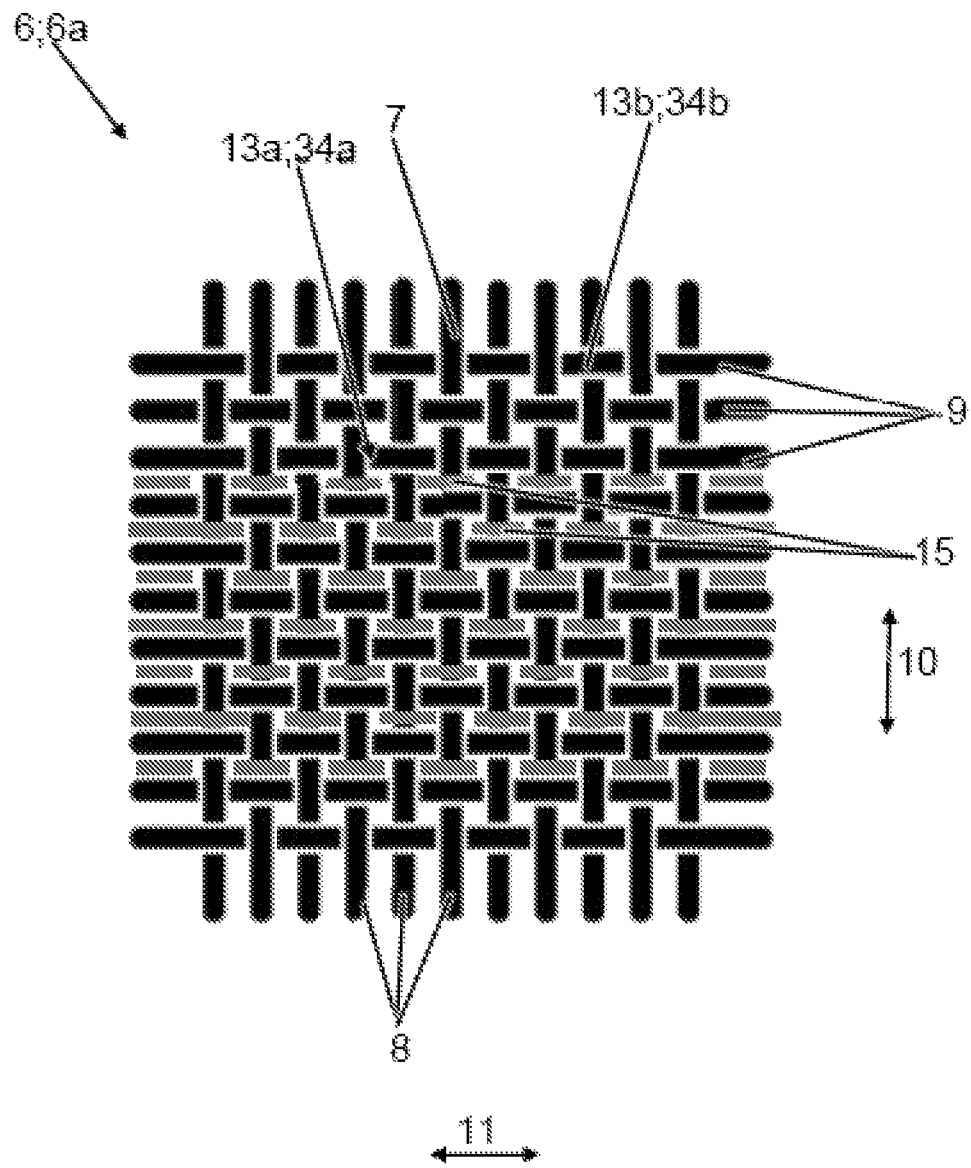
FIG. 4 is a top view schematic of a supporting woven fabric of the sheet material according to the present disclosure according to a further embodiment with reinforcing weft threads only.

The reinforcing regions 13a can extend, for example, over the entire extension of the supporting woven fabric 6a in the warp direction or weft direction 11 (FIG. 4) or only over a partial region of the extension of the supporting woven fabric 6a in the warp direction 10 and weft direction 11 (FIGS. 2 and 3).

If the reinforcing region 13a only extends over a part of the width of the supporting woven fabric 6a in the weft direction 11, the reinforcing weft threads 15 of the reinforcing region 13a also extend only over a part of the width of the supporting woven fabric 6a in the weft direction 11. Thereby, the reinforcing weft threads 15 of a reinforcing region 13a can be comprised of individual weft thread elements 15a not connected to each other (Lancé découpé) (FIG. 2). During the manufacturing the individual weft thread elements 15 are cut off after weaving with the base fabric 7. Thereafter, they may be fixedly connected to the base fabric 7, in particular intertwined or adhered. It is thereby prevented that the weft thread elements 15 can be pulled out of the base fabric 7.

The reinforcing warp threads 14 of a reinforcing region 13a are also comprised of individual warp thread elements 14a not connected to each other (FIG. 2) that are also cut off after weaving with the base fabric 7. Thereafter, the warp thread elements 14a may also be fixedly connected to the base fabric 7, in particular intertwined or adhered, in order to prevent the warp thread elements 14a from being pulled out of the base fabric 7.

Alternatively thereto, the reinforcing weft threads 15 of a reinforcing region 13a not extending over the entire width in the weft direction 11 are comprised of a continuous additional weft thread 16 that is guided back-and-forth over the entire reinforcing region 13a (Broché) (FIG. 3). The two ends of the additional weft thread 16 may also be fixedly connected to the base fabric 7, in particular intertwined or adhered. The additional weft thread 16 may also lead to the next reinforcing region 13a (not shown). The continuous additional weft thread 16 ensures a very firm binding of the reinforcing weft threads 14 into the base fabric 7.

If the reinforcing region 13a extends over the entire extension of the supporting woven fabric 6a in the warp direction 10 (not shown) or in the weft direction 11 (FIG. 4), the reinforcing warp threads 14 or the reinforcing weft threads 15 also extend over the entire extension of the supporting woven fabric 6a in the warp direction 10 or in the weft direction 11 (Lance). However the respective other reinforcing threads 14; 15 of the reinforcing region 13a extend only over a part of the extension of the supporting woven fabric 6a in the warp direction 10 or weft direction. The reinforcing region 13a is then strip-shaped.

The warp and weft threads 8; 9; 14; 15 each are monofilament threads or multifilament threads. Monofilament threads each consist of a single monofilament. Multifilament threads consist of several monofilaments. The monofilaments can each be formed as a single piece (monolithic) or comprise a core/shell structure. In this regard, a multifilament thread can comprise different monofilaments, for example, of different materials.

Thereby, the base warp threads 8 and the base weft threads 9 may be formed rubbery-elastic. The supporting woven fabric 6a is thereby elastically formed in the warp direction 10 and in the weft direction 11 at least in non-reinforced regions 13b. "Rubbery-elastic" means that the base warp threads 8 and the base weft threads 9 are elastically reversibly deformable. This means they can deform elastically under tensile and compressive loads but then return into their original, undeformed shape. The base warp threads 8 and the base weft threads 9 may be comprised of a polymer, preferably of silicone rubber or natural rubber or aramid or another plastic, for example, based on polyurethane.

According to the present disclosure the reinforcing warp threads 14 and/or reinforcing weft threads 15 serve for increasing the maximum tensile force $F_H$ [N] according to DIN EN ISO 13934-1:2013 and/or for reducing the maximum elongation (=elongation at maximum tensile force–$\varepsilon_H$ [%] according to DIN EN ISO 13934-1:2013) of the supporting woven fabric 6a in the reinforcing regions 13a in the warp direction 10 and/or weft direction 11. The supporting woven fabric 6a and the sheet material 1 thus have a higher maximum tensile force in the reinforcing regions 13a in the warp direction 10 and/or weft direction 11 according to DIN EN ISO 13934-1:2013 than in the non-reinforced regions 13b.

Furthermore, the elongation at maximum tensile force according to DIN EN ISO 13934-1:2013 of the supporting woven fabric 6a and of the sheet material 1 in the warp direction 10 and/or weft direction 11 in the reinforcing regions 13a is respectively less than in the non-reinforced regions 13b.

Furthermore, the ratio of tensile force according to DIN EN ISO 13934-1:2013 to elongation according to DIN EN ISO 13934-1:2013 of the supporting woven fabric 6a and of the sheet material 1 in the warp direction 10 and/or weft direction 11 in the reinforcing regions 13a is respectively greater than in the non-reinforced regions 13b.

The reinforcing warp threads 14 and the reinforcing weft threads 15 may have a greater tensile strength or maximum tensile force and a lower elongation at maximum tensile force than the base warp threads 8 or the base weft threads 9. However, they can also have the same maximum tensile force or a lower maximum tensile force.

The advantage of the reinforcing regions 13a is that they can be provided in a selective manner where the supporting woven fabric 6a is more heavily loaded during the respective use or where a higher strength or rigidity is required, which is described in more detail further below.

The supporting woven fabric 6a may be formed such that it comprises at least one channel or rather a lane or rather a passage 17, which extends perpendicular to the height direction 4c or rather in at least one of the two surface directions 4a; 4b through the supporting woven fabric 6a. Alternatively, the supporting woven fabric 6 comprises several channels 17. The channels 17 comprise at least one, alternatively two, channel ends by which they each open to the environment.

The channels 17 are produced by correspondingly binding or rather weaving the warp and/or weft threads 8; 9; 14; 15. In particular the warp and weft threads 8; 9; 14; 15 are woven together such that the supporting woven fabric 6a comprises single-layer fabric regions 18 as well as at least one at least two-layer fabric region 19, including at least two fabric layers 20a; 20b that are not connected to each other so that the channel 17 is respectively formed between the fabric layers 20a; 20b. The fabric layers 20a; 20b are disposed adjacent to or aligned with each other in the height direction 4c. Here the warp and weft threads 8; 9; 14; 15 of the first fabric layer 20a are not woven with the warp and weft threads 8; 9; 14; 15 of the second fabric layer 20b.

In particular, with respect to the formation of the channels 17 reference is made to the post-published German patent application DE 10 2016 109 070 of the applicant, the disclosure of which is hereby fully incorporated by reference.

According to a further embodiment of the present disclosure the reinforcing regions 13 are realized such that the base warp threads 8 and/or the base weft threads 9 of the reinforcing regions 13a differ from the base warp threads 8 and/or the base weft threads 9 of the non-reinforced regions 13b with respect to at least one mechanical property. Also thereby different mechanical properties are produced. For example, the base warp threads 8 and/or the base weft threads 9 differ from each other with respect to at least one mechanical strength property, for example with respect to the elongation at maximum tensile force in accordance with DIN EN ISO 2062:2010-04 and/or the maximum tensile force according to DIN EN ISO 2062:2010-04. Here the base warp threads 8 and/or the base weft threads 9 of the reinforcing regions 13a and the non-reinforced regions 13b can be comprised of the same or different materials and/or be formed thicker or thinner.

Of course the reinforcing regions 13a can also be formed both by reinforcing threads 14 according to the first embodiment and by other base threads 8; 9 according to the second embodiment.

Alternatively thereto the reinforcing regions 13 can also be realized by a different type of binding than the base binding.

According to a further embodiment of the present disclosure (not shown), the textile fabric 6 is a knitted or crocheted fabric or a non-woven fabric having at least two surface regions differing with respect to at least one mechanical property. Similarly to the supporting woven fabric 6a the respective textile fabric 6 may include a textile base fabric, alternatively a base knitted fabric or base crocheted fabric or a base non-woven fabric, including a base binding made of one or more base threads and, like the supporting woven fabric 6a, is reinforced in reinforcing regions by additional threads and/or different threads and/or different thread densities.

Alternatively, or additionally thereto, the different surface regions are at least partially formed by different base threads and/or other binding types.

Figure 5:
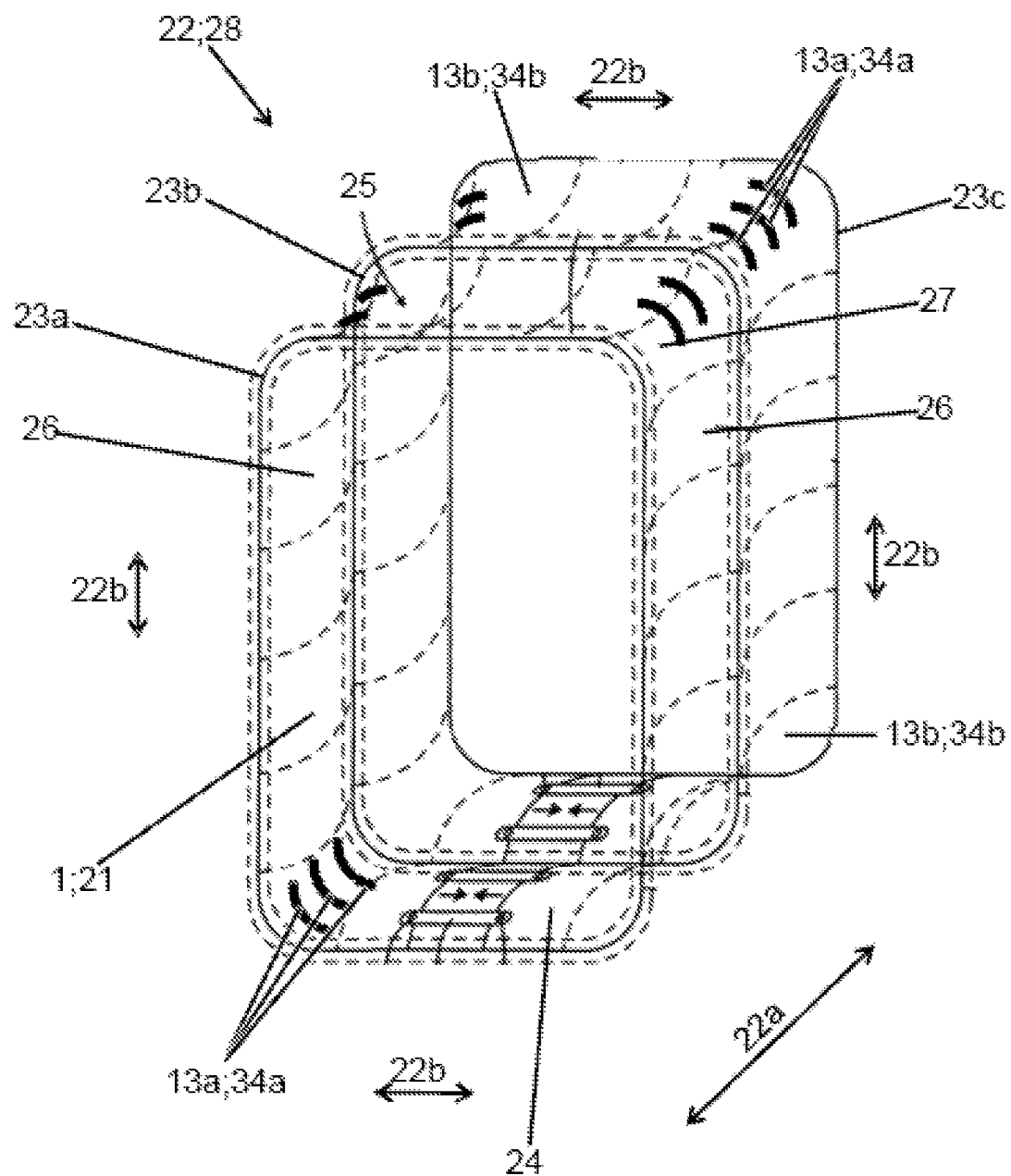
FIG. 5 is a schematic, perspective view of a corrugated bellows.
Figure 6:
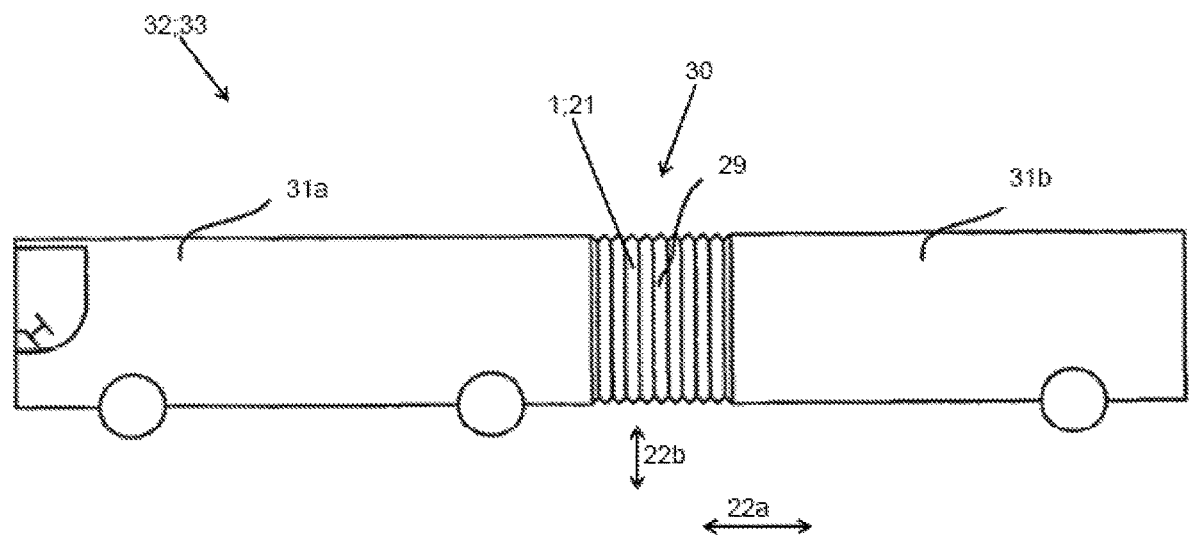
FIG. 6 is a schematic, side view of a crossway of two vehicle parts with a crossway bellows in the form of a pleated bellows.

As already explained, the sheet material 1 according to the present disclosure may be used as bellows wall 21 of a crossway bellows 22 (FIGS. 5 and 6). The crossway bellows 22 comprises a bellows longitudinal direction 22a and a bellows circumferential direction 22b perpendicular thereto. In addition, the crossway bellows 22 comprises a plurality of bellows tensioning frames 23a-c running around the circumference and arranged at a distance from each other in the bellows longitudinal direction 22a, as well as the bellows wall 21 tensioned between the bellows tensioning frames 23a-c. The bellows wall 21 surrounds a tunnel-like or rather channel-like bellows interior space.

Furthermore, bellows tensioning frames 23a-c may be each configured rectangular. Consequently the crossway bellows 22 may have a rectangular cross-section or is configured box-shaped. Furthermore the bellows wall 21 may include a bellows base 24, which may be horizontal, a bellows roof 25, and two bellows side walls 26, which may be vertical. The bellows base 24 and the bellows roof 25 each merge via corner regions 27 into the bellows side walls 26.

However, the crossway bellows 22 can also have a different, for example, a circular cross-section (not shown).

The crossway bellows 22 may be a corrugated bellows 27 (FIG. 5) or to a pleated bellows 28 (FIG. 6). In the case of the corrugated bellows 27, the bellows wall 21 is tensioned in a known manner such that the bellows wall 21 in the non-stressed state or rather in the not extended state of the corrugated bellows 27, corrugations are formed between the bellows frames 23a-c. In a known manner, the pleated bellows 28 comprises alternating inner and outer pleat edges, wherein the bellows wall 21 is tensioned at the pleat edges each in a bellows frame 23a-c.

As already described in DE 10 2016 109 070, the channels 17 serve for receiving the bellows frames 23a-c. This means the bellows frames 23a-c are disposed in the channels 17 or inserted therein. The bellows wall 21 is thereby clamped onto the bellows frames 23a-c or clamped between them. For this purpose the channels 17 extend, for example, in bellows circumferential direction 22b.

In the corner regions 27 the bellows wall 21 also includes a plurality of reinforcing regions 13a. The strip-shaped reinforcing regions 13a have a longitudinal extension in bellows circumferential direction 22b. They serve for reinforcing the corner regions 27. The corner regions 17 are furthest removed from the movement axes so that the largest forces and movements occur here. Consequently, the reinforcing regions 13a may be located in the corner regions 17. A further reason is the shaping of the corner regions 17 so that they are neatly shaped when the corners are moved together.

Furthermore, the two fabric layers 20a: 20b may also include a reinforcing region 13a (FIG. 1) at their two end regions, i.e., where they are brought together again. This serves to laterally reinforce the two-layer regions so that they can support corresponding mechanical loads.

The crossway bellows 22 according to the present disclosure may be used for a passageway 30 at which two vehicle parts 31a, 31b of a vehicle 32 are connected to be moved relative to each other, in particular in an articulated manner, in order to protect the passageway 30 against weather and draft air. The vehicle 32 may be an articulated bus 33 or a rail vehicle, in particular a passenger train, a tram, a metro or subway. The two vehicle parts 31a, 31b can rotate relative to each other, in particular about a vertical axis of rotation, and/or can be displaced relative to each other in the direction of travel and/or can be displaced transverse to the direction of travel and/or are rotary connected to each other about a longitudinal axis of the vehicle (wobble).

The crossway bellows 22 can further also be a crossway bellows 22 for protection of the crossway of a flight passenger bridge or staircase to the aircraft and/or to the terminal.

The crossway bellows 22 can also be a crossway bellows 22 for protection of the crossway between two building parts, for example, for protection of the crossway between a bridge and a section of the building.

Similarly, the crossway bellows 22 can be formed from several, planar bellows elements (not depicted), which each comprise two straight tensioning frame elements, between which a sheet material 1 according to the present disclosure is tensioned.

Also, the sheet material 1 can be used as a wall for crossway elements which serve to protect a crossway between two machine parts or other components which can move relative to each other, in order to protect the respective crossway against external influences, in particular contamination, and to seal it against the environment. The crossway element herein can have different shapes, e.g. a flat shape or a U-shape or even the shape of a crossway bellows. In addition, the crossway element is securely joined to one of the two components, analogous to the crossway 30 of the two vehicle parts 31a, 31b.

Furthermore, the crossway element, in particular the crossway bellows 22, or rather its wall can also be formed to be uncorrugated and without pleats. In this case, the wall, in particular the bellows wall 21, is formed as being accordingly elastic. In particular, the wall is formed according to German patent application DE 10 2011 107 370 A1.

The advantage of the sheet material 1 is that no individual material sections need to be manufactured and cut-off in the form of pleats or corrugations and connected via bellows frames. The bellows wall 21 of a crossway bellows 33 can be comprised, for example, of a single material section since the bellows tensioning frames 23a-c will be or are retracted into the channels 12 and the reinforcing regions 13a are integrated into the sheet material 1 or the bellows wall 21. In known corrugated bellows, however, one material strip is usually present per corrugation, and with known pleated bellows one material strip respectively extends from pleating edge to pleating edge.

Furthermore, no additional reinforcing material strips or the like need be applied to the sheet material 1. The sheet material 1 or the bellows wall 21 thereby has a smooth outer contour that follows the vehicle, which promotes the aerodynamics and also facilitates cleaning.

The bellows wall 21 also has a high seal-tightness since it is comprised of a continuous material section without seams.

Furthermore, the supporting woven fabric 6a can be manufactured in a simple and highly variable manner. Because the reinforcing regions 13a are produced directly during weaving by corresponding lifting or lowering of the individual warp threads 8; 14 and controlling of the weft threads 9; 15.

Here, it is within the scope of the present disclosure that the reinforcing support 2 is formed as being multi-layered and consists of a plurality of planar textile fabrics, which are each joined together by means of an adhesive layer made of a polymer. At least one of the textile fabrics is the supporting woven fabric 6a according to the present disclosure. Alternatively, the reinforcing support 2 consists a supporting woven fabric 6a. In addition, an adhesive layer made of a polymer can be provided between the polymer coating 3 and the reinforcing support 2.

Furthermore, the reinforcing regions 13a can of course be present at any other points of the bellows wall 21. In particular the reinforcing regions 13a can also be provided for attaching further attachment parts to the bellows in order to reinforce the corresponding region. Or for reinforcing particularly stressed bellows regions or parts.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A multi-layered sheet material comprising a reinforcing support that comprises a polymer coating at least on one side, wherein the reinforcing support comprises at least one textile fabric,
   wherein the textile fabric comprises at least two surface regions, which have a planar extension into a first and second surface direction of the textile fabric, and which differ from each other in at least one mechanical property.

2. The sheet material according to claim 1, wherein the surface regions differ from each other with respect to at least one mechanical strength property in at least one surface direction of the multi-layered sheet material with respect to the maximum tensile force $F_H$ according to DIN EN ISO 13934-1:2013 and/or the elongation at maximum tensile force $\varepsilon_H$ according to DIN EN ISO 13934-1:2013 and/or the ratio of tensile force according to DIN EN ISO 13934-1:2013 to elongation according to DIN EN ISO 13934-1:2013.

3. The sheet material according to claim 2, wherein the surface regions pertain to at least one reinforcing region and at least one non-reinforced region, wherein in at least one surface direction of the multi-layered sheet material the reinforcing region has a higher maximum tensile force $F_H$ according to DIN EN ISO 13934-1:2013 and/or a higher elongation at maximum tensile force $\varepsilon_H$ according to DIN EN ISO 13934-1:2013 and/or a greater ratio of tensile force according to DIN EN ISO 13934-1:2013 to elongation according to DIN EN ISO 13934-1:2013 than the non-reinforced region.

4. The sheet material according to claim 3, wherein the textile fabric comprises a textile base fabric having a base binding made of one or more base threads, wherein the base fabric forms the non-reinforced region(s) and wherein the textile fabric is reinforced in the at least one reinforcing region by additional threads provided in addition to the base threads and/or other base threads and/or a binding different from the base binding.

5. The sheet material according to claim 1, wherein the reinforcing support consists of the textile fabric.

6. Use of the sheet material according to claim 1 as a bellows wall of a crossway bellows.

7. A circumferential crossway element for protection of a passageway of two vehicle parts or components, which are connected together movably relative to each other, against external influences, wherein the crossway element comprises at least two tensioning elements being spaced apart from each other, wherein at least one sheet material according to claim 1 is stretched between the at least two tensioning elements.

8. The crossway element according to claim 7, wherein the crossway element is a crossway bellows, wherein the crossway bellows comprises at least two bellows tensioning frames spaced from each other and a bellows wall that consists of the multi-layered sheet material.

9. The crossway element according to claim 8, wherein in the normal state of the vehicle parts with respect to each other, the bellows wall does not have corrugations or pleats, or the crossway bellows is configured as a corrugated or pleated bellows.

10. A vehicle, comprising at least two vehicle parts connected together movably relative to each other at a passageway, wherein for each passageway, the vehicle comprises at least one crossway element, according to claim 7 for protecting the passageway.

11. A flight passenger bridge or staircase, comprising at least one crossway element according to claim 7 for protecting the passageway of the flight passenger bridge or staircase to the aircraft and/or to the terminal.

12. A building connection comprising two building parts connected together at a passageway, wherein the building connection comprises at least one crossway element according to claim 7 for protecting the passageway of the two building parts.

13. A rail vehicle or an articulated bus, each comprising at least two vehicle parts connected together movably relative to each other at a passageway, or a flight passenger bridge or staircase, comprising a passageway of the flight passenger bridge or staircase to the aircraft and/or to the terminal, wherein the rail vehicle or articulated bus or flight passenger bridge or staircase comprises at least one crossway element according to claim 7 for protecting the passageway, the crossway element being a crossway bellows.

14. The sheet material according to claim 1, wherein the reinforcing region extends two-dimensionally only over a partial region of the entire two-dimensional extension of the textile fabric.

15. A multi-layered sheet material comprising a reinforcing support that comprises a polymer coating at least on one side wherein the reinforcing support comprises at least one supporting woven fabric, wherein the supporting woven fabric comprises a base woven fabric made of base warp threads and base weft threads as well as at least one planar reinforcing region extending two-dimensionally only over a partial region of the entire two-dimensional extension of the supporting woven fabric and having a plurality of additional reinforcing warp threads and/or a plurality of additional reinforcing weft threads that are woven with the base woven fabric.

16. The sheet material according to claim 15, wherein the reinforcing region extends two-dimensionally over the entire extension of the supporting woven fabric in the warp direction and only over a partial region of the extension of the supporting woven fabric in the weft direction, or that the reinforcing region extends two-dimensionally over the entire extension of the supporting woven fabric in the weft direction and only over a partial region of the extension of the supporting woven fabric in the warp direction.

17. The sheet material according to claim 15, wherein the reinforcing region extends two-dimensionally only over a partial region of the extension of the supporting woven fabric in the warp direction and only over a partial region of the extension of the supporting woven fabric in the weft direction.

18. The sheet material according to claim 15, wherein the reinforcing weft threads of the reinforcing region not extending over the entire extension of the supporting woven fabric in the weft direction are comprised of individual weft thread elements not connected to each other.

19. The sheet material according to claim 15, wherein the reinforcing weft threads of the reinforcing region not extending over the entire extension of the supporting woven fabric in the weft direction are comprised of a continuous additional weft thread that is guided back and forth over the entire reinforcing region.

20. The sheet material according to claim 15, wherein the reinforcing warp threads of the reinforcing region not extending over the entire extension of the supporting woven fabric in the warp direction are comprised of individual warp thread elements not connected to each other.

21. The sheet material according to claim 15, wherein the reinforcing support consists of the supporting woven fabric.

22. Use of the sheet material according to claim 15 as a bellows wall of a crossway bellows.

23. A circumferential crossway element for protection of a passageway of two vehicle parts or components, which are connected together movably relative to each other, against external influences, wherein the crossway element comprises at least two tensioning elements being spaced apart from each other, wherein at least one sheet material according to claim 15 is stretched between the at least two tensioning elements.

24. A vehicle, comprising at least two vehicle parts connected together movably relative to each other at a passageway, wherein for each passageway, the vehicle comprises at least one crossway element according to claim 23 for protecting the passageway.

25. A flight passenger bridge or staircase, comprising at least one crossway element according to claim 23 for protecting the passageway of the flight passenger bridge or staircase to the aircraft and/or to the terminal.

26. A building connection comprising two building parts connected together at a passageway, wherein the building connection comprises at least one crossway element according to claim 23 for protecting the passageway of the two building parts.

* * * * *